Oct. 5, 1965  J. C. STILES  3,209,601
QUARTZ ACCELEROMETER
Filed Aug. 16, 1962  2 Sheets-Sheet 1
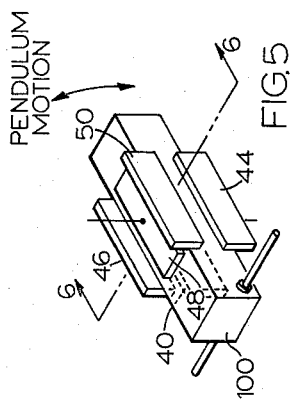
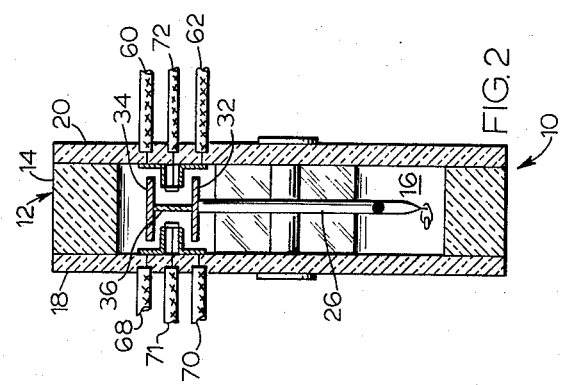
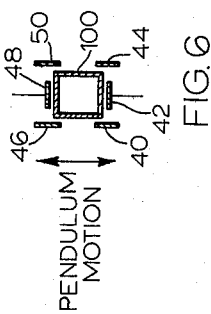
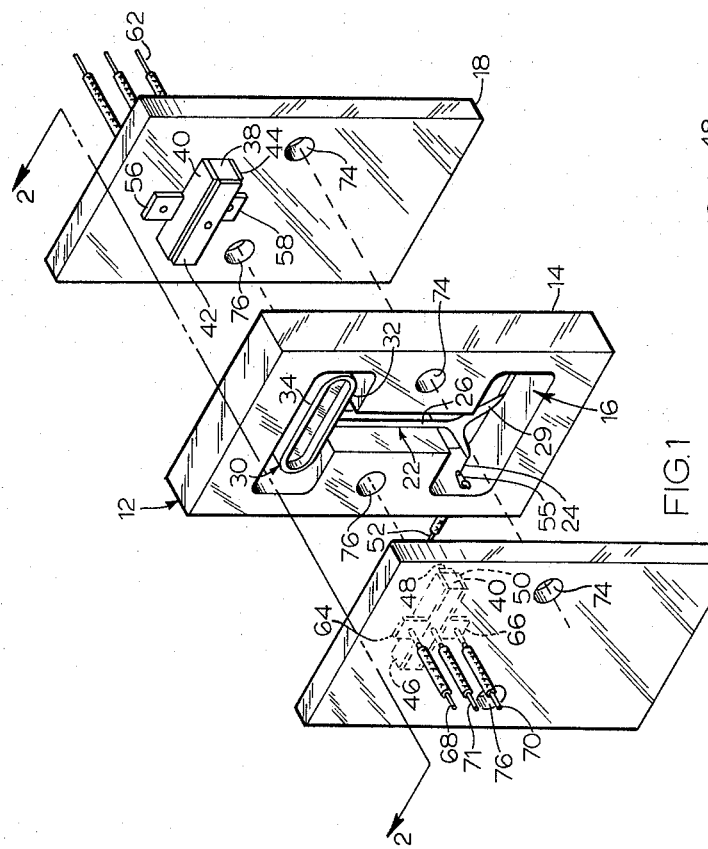
JOHN C STILES
INVENTOR.
BY S. A. Giarratana
George B. Oujevolk
attorneys Oct. 5, 1965  J. C. STILES  3,209,601
QUARTZ ACCELEROMETER
Filed Aug. 16, 1962  2 Sheets-Sheet 2

JOHN C. STILES
INVENTOR.

BY S. A. Giarratana
George B. Oujevolk
attorneys 3,209,601
QUARTZ ACCELEROMETER
John C. Stiles, Morristown, N.J., assignor to General Precision Inc., Little Falls, N.J., a corporation of Delaware
Filed Aug. 16, 1962, Ser. No. 217,320
7 Claims. (Cl. 73—517)

The present invention relates to accelerometers, and more particularly to an electrostatic pendulous accelerometer made principally from quartz and platinum.

The field of high precision accelerometers has been largely dominated by a single type which has a proof mass with one or more force coils operating in the field of a permanent magnet. The proof mass is servo-controlled to its null position by the interaction of the permanent magnet field with control currents in the force coils. The accelerometer is in the equilibrium state when the forces on the proof mass are just sufficient to accelerate it at the same rate as the body of the instrument. The current required to produce this force is proportional to the acceleration, and is measured by recording the voltage developed across a series resistor. Typical scale factors are 1–5 volts/g.

Unfortunately, the accuracy required of this accelometer is difficult to obtain outside of the laboratory. The main problem has been the stability of the magnetic field because it has proved to be very difficult to stabilize magnets to an accuracy better than one part in a thousand per year, and even this accuracy is strongly dependent on environmental conditions, particularly temperature and thermal history. Past development of magnet materials has been quite gradual, and it appears that little or no improvement in magnetic stability will be achieved in the near future.

Accordingly, it is one object of the present invention to develop a high precision inertial accelerometer which does not depend upon magnetism for its operation. This is accomplished by providing a proof mass which is servo-controlled to the null position entirely by electrostatic forces. This avoids most of the scale factor problem, since electrostatic forces depend entirely upon the geometry and the voltages involved and not upon the properties of materials. Instead of making a magnetically stable magnet, it is only necessary to make a mechanically stable accelerometer structure. This is accomplished by making all the components of the accelerometer of a suitable glass, such as quartz, and including a metal such as platinum where necessary to provide for electrical conductivity.

Because electrostatic forces are quite small, a very small and light proof mass is employed in the order of a few milligrams to obtain a reasonable voltage level and geometry. The proof mass is supported as a pendulum within a glass housing by quartz fiber hinges at one end thereof, and because of its extremely light weight, the proof mass can be damped by gas in a very effective manner. The electrostatic restoring force eliminates the internal problem with scale factor drops encountered when conventional magnetic restoring forces are employed. In addition, the accelerometer draws no steady state power with the exception of the power consumed in exciting the pickoff. Thus the power actually dissipated in the accelerometer will be in the order of a few milliwatts. Finally, since the very light weight of the proof mass enables gas damping to be used, the design and construction of the control amplifier is greatly simplified.

Additional objects of the present invention are to provide a high precision accelerometer which is light in weight, fabricated from the most mechanically stable materials, reliable and effective in operation, has improved linearity, null stability, operating temperature range and scale factor stability, and can be effectively gas damped.

FIG. 1 is an exploded perspective view of an accelerometer embodying features of the present invention;

FIG. 2 is a sectional view taken along the line 2—2 of FIG. 1 with the accelerometer shown in assembled form;

FIG. 5 is a perspective view of a modified pendulum and electrode arrangement with the accelerometer housing not shown for the sake of clarity; and FIG. 6 is a sectional view taken along the line 6—6 of FIG. 5.

Figure 3:
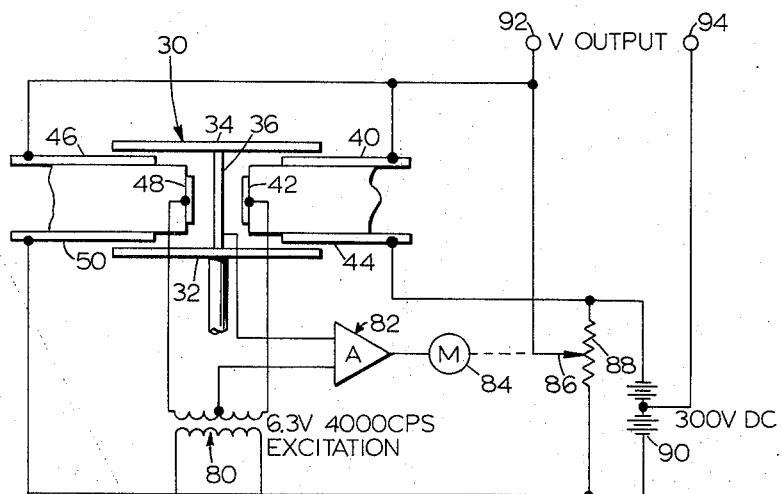
FIG. 3 is a schematic diagram illustrating one arrangement for controlling the accelerometer illustrated in FIG. 1.

Referring to FIGS. 1 and 2, an accelerometer 10 embodying features of the present invention is illustrated which comprises a housing 12 having a flat rectangular central portion 14 with an I-shaped chamber 16 therein enclosed by two cover plates 18 and 20 bonded to opposite faces of the central portion 14. The housing 12 is preferably made of glass because of its high stability and particularly quartz because it is perhaps the most mechanically stable material known to man.

A pendulum 22 is supported within the housing on a pair of torsion fiber hinges 24 of the type commonly used in micro-balances and similar equipment. The pendulum 22 has a stem 26 extending substantially perpendicular to the axis defined by the torsion fibers 24 with Y-shaped arms 29 at one end thereof joined to the torsion fibers and a conductive box 30 on the other end thereof forming a proof mass. The conductive box 30 has parallel spaced apart walls 32 and 34 extending in a plane substantially perpendicular to the stem 26 and the box is divided in half by a central membrane 36 perpendicular to the walls 32 and 34 to form two outwardly presenting recesses. The pendulum 22 is preferably made of quartz with a very thin wall thickness and the entire pendulum is slightly covered with platinum to make it electrically conductive for a purpose to be described in greater detail hereinafter.

Quartz insulating blocks 38 and 40 project from the inner faces of the cover plates 18 and 20, respectively, into the recesses of the box 30 on opposite sides of the conductive membrance 36. The surfaces of blocks 38, 40 are lightly coated with platinum to form conductive plates 40, 42 and 44 on the block 38 and similar conductive plates 46, 48 and 50 on the block 40. The conductive plates 40 and 46 cooperate with the platinum coating on the inner surface of the wall 32 of the box 30 to provide one set of capacitor plates and the conductive plates 44 and 50 cooperate with the platinum coating on the upper surface of the wall 34 to provide another set of capacitor plates, all of which are connected in a circuit, as will be described, to provide an electrostatic restoring force for urging the conductive box 30 to a null position. The conductive plates 42 and 48 are positioned on opposite sides of the conductive membrane 36 to provide a capacitor pickoff with the conductive membrane acting as the movable element.

The electrical connection to the pendulum 22 may be made by means of an external lead 52 projecting from the central portion 14 of the housing with the inner end 54 thereof electrically connected to the fixed end of the torsion fiber 24 adjacent thereto by a jumper 55. Terminals 56 and 58 may be provided on the inside face of the cover plate 18 to facilitate connection of leads 60 and 62 to the conductive plates 40 and 44, respectively, and similar terminals 64 and 66 may be provided on the inside face of the cover plate 20 to facilitate, electrical connection of leads 68 and 70 to the conductive plates 46 and 50, respectively. Leads 71 and 72 may be projected directly through the insulated blocks 38 and 40, respectively, to make electrical connection to the conductive plates 42 and 48. The housing 12 may also be provided with three aligned apertures 74 and a second set of three aligned apertures 76 to provide through holes to facilitate mounting the housing on a supporting member.

One type of control circuit for the accelerometer 10 is schematically illustrated in FIG. 3 wherein the conductive plates 42 and 48 are shown on opposite sides of the conductive membrane 36 to provide the capacitor pickoff, and the conductive plates 40, 44, 46 and 50 are shown partially overlying the inside surfaces of the walls 32 and 34 of the conductive box 30. The plates 42 and 48 are connected to opposite ends of a secondary winding of a transformer 80 and a suitable amplifier 82 is connected between the conductive partition 36 and a point between the ends of the secondary winding of the transformer 80. As illustrated in FIG. 3, the conductive box 30 is in the null position so that no output signal is produced. However, when the box shifts in one direction or the other in response to an acceleration force, an output signal is produced which is amplified by the amplifier 82 to drive a motor 84 in the appropriate direction to change the position of a slide 86 of a potentiometer 88.

A battery 90 provides a voltage drop across the potentiometer and the conductive plate 50 is connected to the lower end of the potentiometer while the conductive plate 44 is connected to the upper end of the potentiometer. A pair of output terminals 92 and 94 are provided with the terminal 94 connected to a center terminal on the battery 90. The output terminal 92 is connected directly to the conductive plates 40 and 46 and directly to the potentiometer slide 86. With this arrangement, the plates 40 and 44 will cooperate with the walls 32 and 34 of the conductive box 30 to exert an electrostatic pulling force to the right on the conductive box, and the plates 46 and 50 will cooperate with the walls 32 and 34 to exert an electrostatic pulling force to the left on the conductive box, the magnitude of the forces depending on the voltage across the plates. When the motor 84 actuates the slide 86 in one direction or the other in response to an output signal from the capacitor pickoff, the voltage across the upper and lower halves of the potentiometer 88 will be changed so that the aforementioned pulling forces are unbalanced to hold the conductive box 30 at the null position. This unbalancing produces a voltage output between the terminals 92 and 94 which is directly proportional to the acceleration force acting on the conductive box 30. It is noted at this point that the motor operated potentiometer slide has been shown by way of example only since other voltage dividing schemes or other means for varying the voltage across the electrostatic restoring force plates would be satisfactory.

In the specific embodiment illustrated in FIG. 3, the exciting force applied by the transformer 80 is 6.3 volts at 4000 c.p.s., and the D.C. voltage of the battery 90 is 300 volts. The weight of the proof mass is about 2 milligrams and the geometry of the plates 40, 44 and 46, 50 providing the electrostatic restoring force is such that the electrostatic force between each set of plates and the proof mass is about 32 dynes at 300 volts. This allows for the operation of the proof mass at up to 16 $g$'s acceleration.

Because of the very light weight of the proof mass, gas damping can be very effectively employed. The entire chamber 16 within the central portion 14 of the housing is filled with a suitable gas such as air, or a more viscous gas such as argon, and because the insulated blocks 38 and 40 substantially fill the recesses on each side of the conductive membrane 36, the gas is forced to flow from one side of the box to the other as the pendulum is displaced to effectively damp the movement of the pendulum. This damping force is sufficient to give critical damping at a natural frequency of 300 c.p.s. with air, or 600 c.p.s. with a more viscous gas such as argon. The viscosity of the gas changes rather slowly, increasing with increasing temperature, and the accelerometer damping can be made to vary by less than 20% over a 300° C. range.

By making all of the components of the accelerometer 10 of glass or platinum, the accelerometer is exceptionally stable, and can be annealed as a completed unit in an oven at approximately 1200° C. to relieve all stresses. No further adjustments are required, and the unit will stay in the stress-free condition indefinitely. Such an accelerometer can be operated at very high temperatures since the softening point of quartz, for example, is above 1500° C., and continuous operation of the accelerometer at 1000° C. would present no difficulties. The accelerometer can operate satisfactorily in very severe nuclear radiation environment, and this ability is limited only by the problem of the shorting of the external connections to the accelerometer when the radiation becomes heavy enough to form a plasma. Since glass is a relatively light material, its density being approximately twice that of water and one quarter that of steel, it can be effectively used to make the light-weight pendulum.

Platinum has been used in the form of a coating on the glass to provide the necessary electrical conductivity because it is mechanically stable, chemically inert and capable of being bonded to glass. Any other electrically conductive materials which would furnish these properties could also be used satisfactorily. Another material which may be used for the pendulum 22 is alumina. In using this material a pendulum shaped body would be formed of aluminum and the surface thereof anodized in a manner to enable the aluminum body to be dissolved away so that the anodized coating can provide the necessary thin walled pendulum.

Figure 4:
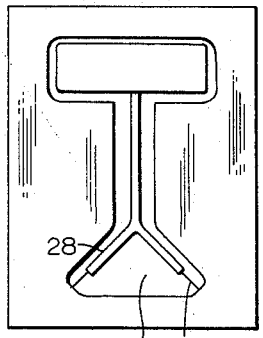
FIG. 4 is a longitudinal sectional view illustrating a modification of the invention.

Another manner of supporting the pendulum 22 in the housing is illustrated in FIG. 4 wherein quartz fiber hinges 96 are positioned in direct extension of the Y-shaped arms 28 of the pendulum with the ends thereof fixed to sloping surfaces 98 at the corners of the recess 16. With this construction, the fibers 96 would be stressed in bending rather than in torsion as are the fibers in FIG. 1. This results in a somewhat stiffer suspension for the pendulum, which may increase the gain required of the capture amplifier, but it also provides a sufficiently high natural frequency to encounter less trouble from vibration.

Referring to FIGS. 5 and 6 a pendulum 100 is illustrated which eliminates the need for the conductive box provided on the end of the pendulum 22 previously described. The pendulum 100 is square in cross-section and is pivotally supported at one end thereof by the torsion fiber hinges 24. With this construction the conductive plates 40, 44, 46 and 50 can be arranged to overlie opposite walls of the pendulum which are coated with platinum as before to provide the sets of capacitor plates for applying the electrostatic restoring force, and the conductive plates 42 and 48 can be arranged to overlie the other opposed walls of the pendulum which are also coated with platinum to provide the pickoff signal for detecting the position of the pendulum. Since the pendulum is square, it can be positioned withtin a chamber in the accelerometer housing having a rectangular cross-section with a small clearance provided between the pendulum and the walls of the chamber on which the conductive plates 40, 44, 46 and 50 are positioned. This will force gas in the chamber to pass through these clearances from one side of the pendulum to the other in response to movement of the pendulum to effectively gas damp the movement.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

In the claims:

1. An accelerometer comprising a housing having a chamber therein, a pendulum having a conductive box on one end thereof and supported at the other end thereof for swinging movement within said chamber, said conductive box having an opening therethrough divided into two outwardly presenting recesses by a membrane extending perpendicular to the direction of movement of the box, a capacitor plate on each side of said membrane in position to form a capacitor pickoff with the membrane acting as the movable element, conductive plates on eachside of said membrane extending parallel to surfaces of the conductive box in position to exert opposed pulling forces on the conductive box when a voltage is applied thereacross, and control means for applying and varying the voltage across said conductive plates and surfaces of the box in response to an output signal from said capacitor pickoff to restrain the conductive box in a null position.

2. The invention as defined in claim 1 wherein said pendulum is hingedly supported in said chamber by a pair of glass torsion fibers which define the pivot axis of the pendulum.

3. The invention as defined in claim 1 wherein said pendulum is hingedly supported in said chamber by a pair of glass fibers positioned to be stressed in bending to resist movement of the pendulum.

4. The invention as defined in claim 1 wherein the housing is made of glass, the box has a proof mass of several milligrams and the conductive elements including the conductive plates and capacitor plates are provided by an electrically conductive metal coated on the housing and the pendulum.

5. An accelerometer comprising a housing having a chamber therein, a pendulum having a conductive box on one end thereof and supported for swinging movement within said chamber at the other end thereof, said box having an opening extending therethrough defined in part by a pair of parallel spaced apart walls extending in the direction of movement of said box, said opening being interrupted by a conductive membrane extending perpendicularly between said pair of walls in a manner to form a pair of outwardly presenting recesses in the box, a pair of insulated blocks on said housing projecting into and substantially filling different ones of said recesses, three conductive plates on each of said insulated blocks, each of said blocks having one plate thereon parallel and adjacent to one of said walls, a second plate thereon parallel to said membrane and a third plate thereon parallel and adjacent to the other of said walls, and control means for connecting said second plates and conductive membrane as a capacitor pickoff with the conductive membrane acting as the movable element and connecting the remaining plates and walls as capacitors for exerting electrostatic forces on the conductive box in response to the output signal of the capacitor pickoff to restrain the pendulum in the null position.

6. The invention as defined in claim 5 wherein said control means comprises a transformer adapted to be connected to a source of A.C. power, said second conductive plates being electrically connected to opposite ends of the secondary winding of said transformer, an amplifier connected between said conductive box and a point on said secondary winding between the ends thereof, a motor energized by said amplifier, a potentiometer having a slide arm actuated by said motor, a source of D.C. power connected in parallel with said potentiometer, a pair of output terminals, means for electrically connecting one of said output terminals to said first conductive plates and to said potentiometer slide, means for electrically connecting said other output terminal to a center terminal of said battery, and means for electrically connecting one end of said potentiometer to one of said third plates and the other end of said potentiometer to the other of said third plates.

7. An accelerometer comprising a proof mass of rectangular cross-section pivotably supported at one end for movement in response to acceleration forces, said pendulum having a first pair of opposed side walls substantially parallel to the line of movement of the proof mass and a second pair of opposed side walls substantially perpendicular to said line of movement, each of said side walls having a conductive coating on the outer surface thereof, a first set of conductive plates positioned to cooperate with said first pair of side walls to exert opposed electrostatic pulling forces on the proof mass, a second set of conductive plates positioned to cooperate with said second pair of side walls to detect the position of said proof mass, said first and second sets of conductive plates being positioned about the other end of the pendulum, and control means for applying and varying a voltage across the first set of conductive plates and first pair of side walls in response to an output signal from said second pair of conductive plates to restrain the proof mass in a null position.

References Cited by the Examiner

UNITED STATES PATENTS

| | | | |
|---|---|---|---|
| 2,130,648 | 9/38 | Smith | 73—382 |
| 2,243,749 | 5/41 | Clewell | 73—382 |
| 2,258,613 | 10/41 | Kannenstine | 73—382 |
| 2,440,342 | 4/48 | Mayne | 73—517 |
| 2,494,109 | 1/50 | Wolfe | 73—517 |
| 2,542,018 | 2/51 | Ferrill | 73—505 |
| 2,598,552 | 5/52 | Jansen | 73—515 |
| 2,797,912 | 7/57 | Trostler | 73—516 |
| 2,814,768 | 11/57 | Kinkel | 73—517 |
| 2,869,851 | 1/59 | Sedgfield | 73—517 |
| 2,966,802 | 1/61 | Steen | 73—516 |
| 2,968,952 | 1/61 | Stalder | 73—517 |
| 3,003,356 | 10/61 | Nordsieck | 73—517 |
| 3,078,724 | 2/63 | Gindes et al. | 73—516 |
| 3,091,972 | 6/63 | Johnston | 73—517 |

FOREIGN PATENTS 278,237 9/14 Germany.

RICHARD C. QUEISSER, *Primary Examiner.*

ROBERT L. EVANS, *Examiner.*